(12) United States Patent
Lee et al.

(10) Patent No.: US 7,548,291 B2
(45) Date of Patent: Jun. 16, 2009

(54) REFLECTIVE TYPE LIQUID CRYSTAL DISPLAY DEVICE AND FABRICATION METHOD THEREOF

(75) Inventors: Jong Hwae Lee, Seoul (KR); Jae Hong Hur, Taegu-kwangyokshi (KR)

(73) Assignee: LG Display LCD Co., Ltd., Seoul (KR)

( * ) Notice: Subject to any disclaimer, the term of this patent is extended or adjusted under 35 U.S.C. 154(b) by 336 days.

(21) Appl. No.: 10/964,709

(22) Filed: Oct. 15, 2004

(65) Prior Publication Data

US 2005/0099559 A1    May 12, 2005

(30) Foreign Application Priority Data

Nov. 12, 2003  (KR)  ................ 10-2003-0079818
Oct. 11, 2004  (KR)  ................ 10-2004-0080899

(51) Int. Cl.
*G02F 1/1335*  (2006.01)

(52) U.S. Cl. ................ 349/106; 349/79; 349/113

(58) Field of Classification Search ........ 349/106, 349/74
See application file for complete search history.

(56) References Cited

U.S. PATENT DOCUMENTS 4,772,885 A  *  9/1988  Uehara et al. ............ 349/71
7,145,614 B2   12/2006  Lee et al. ................ 349/106

FOREIGN PATENT DOCUMENTS

| JP | 2003-029301 | 1/2003 |
| WO | WO 99/53373 | 10/1999 |
| WO | WO 02/079869 A1 | 10/2002 |

* cited by examiner

*Primary Examiner*—Richard H Kim
(74) *Attorney, Agent, or Firm*—McKenna Long & Aldridge LLP

(57) ABSTRACT

The present invention provides a reflective type liquid crystal display device and fabricating method thereof, by which resolution is enhanced in a manner of representing two colors from one sub-pixel. The present invention includes a first substrate having a plurality of thin film transistors and a plurality of pixel electrodes within a plurality of sub-pixels defined by a plurality of gate and data lines perpendicularly crossing with each other, respectively, a second substrate assembled to the first substrate to confront, a liquid crystal layer between the first and second substrates, a third substrate assembled to the first substrate to confront, a plurality of reflective electrodes on an inside of the third substrate to correspond to a plurality of the sub-pixels, respectively, and a color filter layer having a plurality of electrophoretic bodies on a plurality of the reflective electrodes wherein each of the electrophoretic bodies is micro-encapsulated with ionic pigment particles.

23 Claims, 10 Drawing Sheets

REFLECTIVE TYPE LIQUID CRYSTAL DISPLAY DEVICE AND FABRICATION METHOD THEREOF

This application claims the benefit of the Korean Application No. P2003-79818 filed on Nov. 12, 2003, which is hereby incorporated by reference for all purposes as if fully set forth herein.

BACKGROUND OF THE INVENTION

1. Field of the Invention

The present invention relates to a liquid crystal display device, and more particularly, to a reflective type liquid crystal display device and fabricating method thereof, by which resolution is enhanced.

2. Discussion of the Related Art

Recently, a liquid crystal display (LCD) device, one of the noticeable flat panel display devices, controls optical anisotropy by applying an electric field to liquid crystals provided with fluidity of liquid and crystalline optical properties. Thus, an LCD includes features such as power consumption less than that of CRT (cathode ray tube), compact size, wide screen, high definition, and the like, and therefore have become very popular.

In the liquid crystal display device, an upper color filter substrate is assembled to a lower thin film transistor (TFT) array substrate facing each other. Liquid crystals having dielectric anisotropy are provided between the upper and lower substrates. The LCD is driven so that TFTs attached to several hundred-thousands pixels are switched via pixel selecting address lines to apply voltage to the corresponding pixels.

Meanwhile, a liquid crystal display device can be categorized into a transmissive type liquid crystal display device, which uses a backlight, a reflective type liquid crystal display device, which uses an external natural light instead of a backlight, and a transflective type liquid crystal display device overcoming the large power consumption problem of using the backlight of the transmissive type liquid crystal display device and the invisibility problem of the reflective liquid crystal display device in case of the insufficient external natural light.

The transflective type liquid crystal display device is provided with both reflective and transmissive parts and can be used as both a reflective type and a transmissive type.

Hence, the pixel electrode in an LCD device is a transmissive electrode or a reflective electrode depending on the type of liquid crystal display device. The transmissive electrode is provided to a transmissive part of the transmissive or transflective type liquid crystal display device, and the reflective electrode is provided to a reflective part of the reflective or transflective type liquid crystal display device.

The transmissive electrode of the transmissive or transflective type liquid crystal display device leads a light of a backlight, which is incident via a lower substrate, to a liquid crystal layer to increase brightness. The reflective electrode of the reflective or transflective liquid crystal display device reflects an external light, which is incident via an upper substrate, to increase brightness when an external natural light is sufficient.

A liquid crystal display device provided with a reflective electrode according to a related art is explained by referring to the attached drawings as follows.

FIG. 1 is a cross-sectional diagram of a reflective type liquid crystal display device according to a related art, and FIG. 2 is a perspective diagram of a reflective type liquid crystal display device according to a related art.

Referring to FIG. 1, in a liquid crystal display device, a gate line 12 and data line 15 cross each other on a lower substrate 111 to define a sub-pixel. A thin film transistor (TFT) is formed on a crossing between the gate and data lines 12 and 15. A pixel electrode 17 is formed in the sub-pixel to be electrically connected to the thin film transistor.

The thin film transistor (TFT) consists of a gate electrode 12a, a gate insulating layer 13, a semiconductor layer 14, and source/drain electrodes 15a/15b, which are stacked in order.

A black matrix layer 22 that blocks light at a periphery of the sub-pixel, a color filter layer 23 of R/G/B (red/green/blue) for implementing color of the sub-pixel, and a common electrode 24 for generating an electric field together with the pixel electrode 17 are formed on the upper substrate 21.

The upper and lower substrates 11 and 21 are assembled together to leave a predetermined gap between them, and a liquid crystal layer is provided in the gap between the upper and lower substrates 11 and 21.

A reflective type liquid crystal display device, the pixel electrode 17 is formed of a metal of high reflectivity such Al, Cu, and the like. In a transflective type liquid crystal display device, a reflective part and transmissive part are defined. A reflective electrode is formed in the reflective part using metal of high reflectivity, whereas a transmissive electrode of a transparent conductive material is formed in the transmissive part to be connected to the reflective electrode.

A retardation film 54 and a polarizing plate 55 are further provided on the upper surface of the upper substrate 21 of the liquid crystal display device.

A method of fabricating a liquid crystal display device is explained as follows.

First of all, metal of low resistance is deposited on the lower substrate 11 by sputtering. A gate line ('12' in FIG. 2) and the gate electrode 12a are then formed by photolithography.

The gate insulating layer 13 is formed on an entire surface including the gate electrode 12a, and the semiconductor layer 14 is formed on the gate insulating layer 13 over the gate electrode 12a.

Metal of low resistance is deposited again on an entire surface including the gate insulating layer 13. A data line ('15' in FIG. 2) and the source/drain electrodes 15a/15b are then formed by photolithography.

In doing so, the data line 15 is formed to cross with the gate line 12 to define the sub-pixel, and the source/drain electrodes 15a/15b are formed on the semiconductor layer 14 to complete the corresponding thin film transistor (TFT).

Subsequently, an organic or inorganic insulating material is deposited at a predetermined thickness on an entire surface including the thin film transistor (TFT) to form a protective layer 16. The protective layer 16 is partially removed to expose a predetermined portion of the drain electrode 15b of the thin film transistor. The pixel electrode 17 is formed on the protective layer 16 in the sub-pixel to be connected to the drain electrode 15b. In case of the reflective type liquid crystal display device, the pixel electrode 17 is provided by a reflective electrode of high reflectivity metal.

Thereafter, a metal layer of high reflectivity is deposited on the upper substrate 21. The metal layer is then patterned to remain on an edge of the sub-pixel only to form the black matrix 22. The color filter layer 23 having an order of red/green/blue is formed on the sub-pixel excluding the black matrix 22.

The color filter layer can be formed by dyeing, dispersion, coating, electrophoretic deposition, or the like, and more particularly, by pigment dispersion.

Specifically, a first color resist colored by red is coated to completely cover the black matrix 22. Exposure is performed on the first color resist using a mask. An unexposed portion of the first color resist is removed to form a first colored layer pattern.

Subsequently, the above steps are repeated to form second and third colored layer patterns to form the color filter layer 23 of R/G/B. The color filter layer 23, as illustrated in FIG. 2, is formed to have a uniform sequence of R/G/B.

In the above-configuration of the color filter layer 23, three sub-pixels consisting of R/G/B implement one pixel to represent colors.

In doing so, a negative resist is used as the color resist, whereby the unexposed portion can be removed. And, the mask used for the exposure of the first color resist is shifted to use in forming the second and third colored layer patterns.

A common electrode 25 for applying an electric field to a liquid crystal cell together with the reflective electrode 17 is formed on an entire surface including the color filter layer 23.

The upper and lower substrates 11 and 21 are assembled to oppose each other after a seal pattern (not shown in the drawing) has been formed on an edge of a display area of the upper or lower substrate 21 or 11 having various devices formed thereon. The liquid crystal layer 25 is then formed between the upper and lower substrates 21 and 11.

The retardation film 54 for changing a polarization of light is provided to the upper surface of the upper substrate 21. For example, the retardation film 54 converts a linearly polarized incident light to a circularly polarized light using a quarter wave plate (QWP) having a $\lambda/4$ phase difference, and vice versa.

A polarizing plate 55 converting a natural light to a linearly polarized light by transmitting a light parallel to an optical transmission axis only is arranged outside the retardation film 54.

Once an external natural light is incident on the liquid crystal display device, the incident natural light is passed through the polarizing plate 55 to be converted to the linearly polarized light. The converted linearly polarized light is then passed through the retardation film 54 to be converted to the circularly polarized light. Subsequently, the circularly polarized light is passed through the upper substrate 21, color filter layer 23, and common electrode 24, which have no influence on the phase of the circularly polarized light at all, in turn.

The circularly polarized light is then passed through the liquid crystal layer 25. In case that the liquid crystal layer 25 is formed to have a $\lambda/4$ phase difference, the circularly polarized light is converted to the linearly polarized light again. The linearly polarized light is reflected on the reflective electrode 17 to turn into the circularly polarized light via the liquid crystal layer 25. The circularly polarized light is passed through the retardation film 54 to turn into the linearly polarized light. The linearly polarized light is then passed through the polarizing plate 55. In doing so, if a polarized direction of the linearly polarized light coincides with the optical transmission axis, the corresponding light is entirely transmitted. If the polarized direction of the linearly polarized light is perpendicular to the optical transmission axis, no light is outputted.

Besides, when the light is outputted, all the colors except a target color of the color filter layer are absorbed in the color filter layer so that a specific color of R/G/B is projected only.

Meanwhile, a backlight unit (not shown in the drawing) may be provided to a backside of the liquid crystal display device to be used as a light source in transmissive mode.

The above-configured reflective type liquid crystal display device operates using an external light incident via the upper substrate, thereby reducing power consumption due to limited or no use of backlight.

However, as three sub-pixels construct one pixel, limitation is put on the related art reflective type liquid crystal display device in raising resolution.

SUMMARY OF THE INVENTION

Accordingly, the present invention is directed to a reflective type liquid crystal display device and fabricating method thereof that substantially obviate one or more problems due to limitations and disadvantages of the related art.

An advantage of the present invention is to provide a reflective type liquid crystal display device and fabricating method thereof, by which resolution is enhanced in a manner of representing two colors from one sub-pixel.

Additional advantages and features of the invention will be set forth in part in the description which follows and in part will become apparent to those having ordinary skill in the art upon examination of the following or may be learned from practice of the invention. The other advantages of the invention may be realized and attained by the structure particularly pointed out in the written description and claims hereof as well as the appended drawings.

To achieve these and other advantages and in accordance with the purpose of the invention, as embodied and broadly described herein, a reflective type liquid crystal display device according to the present invention includes a first substrate having a plurality of thin film transistors and a plurality of pixel electrodes within a plurality of sub-pixels defined by a plurality of gate and data lines perpendicularly crossing with each other, respectively, a second substrate assembled to the first substrate to confront, a liquid crystal layer between the first and second substrates, a third substrate assembled to the first substrate to confront, a plurality of reflective electrodes on the third substrate to correspond to a plurality of the sub-pixels, respectively, and a color filter layer having a plurality of electrophoretic bodies on a plurality of the reflective electrodes wherein each of the electrophoretic bodies is micro-encapsulated with ionic pigment particles.

In another aspect of the present invention, a method of fabricating a reflective type liquid crystal display device includes the steps of forming a plurality of gate and data line on a first substrate to define a plurality of sub-pixels, forming a plurality of thin film transistors at a plurality of intersections between a plurality of the gate and data lines, forming a plurality of pixel electrodes connected to a plurality of the thin film transistors, respectively, assembling a second substrate to the first substrate to confront, forming a liquid crystal layer between the first and second substrates, forming a plurality of reflective electrodes on a third substrate, forming a color filter layer on a plurality of electrophoretic bodies, the color filter layer comprising a plurality of electrophoretic bodies wherein each of the electrophoretic bodies is micro-encapsulated with ionic pigment particles, and assembling the third substrate to the first substrate to confront.

Preferably, each of the electrophoretic bodies is a first electrophoretic body comprising R and G pigment particles, a second electrophoretic body comprising R and B pigment particles, or a third electrophoretic body comprising G and B pigment particles. And, the R and G, R and B, or G and B pigment particles are charged with opposite polarities, respectively.

Preferably, oppositely polarized pigment particles within each of the electrophoretic bodies migrate in opposite directions, respectively according to a voltage applied to the corresponding reflective electrode.

The above-configured reflective type liquid crystal display device enables to implement two colors in one sub-pixel, thereby providing resolution twice higher than that of the related art sub-pixel of the same size.

Namely, three sub-pixels construct two pixels in the present invention, whereas three R/G/B sub-pixels construct one pixel in the related art. By constructing two pixels with three sub-pixels, a size of each sub-pixel can be increased twice to provide the same resolution of the related art. In doing so, the increased size of the sub-pixel is accompanied with an increased opening ratio and a process error thereof can be reduced.

Meanwhile, when forming a first electrophoretic body including R and G pigment particles and a second electrophoretic body including B and G pigment particles on each unit pixel, a liquid crystal layer on each of the first and second electrophoretic bodies is selectively turned on or off within a predetermined period of time. Thus, when sequentially representing R/G/B colors, the R/G/B colors can be formed of two unit pixels, thereby enhancing the image resolution. More specifically, two sub-pixels construct one pixel in the present invention, whereas three R/G/B sub-pixels construct one pixel in the related art.

At this point, when forming two unit pixels having a size corresponding to three unit pixels so as to represent an image having the same resolution, the size of the unit pixel can be increased, thereby enhancing the aperture ratio.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
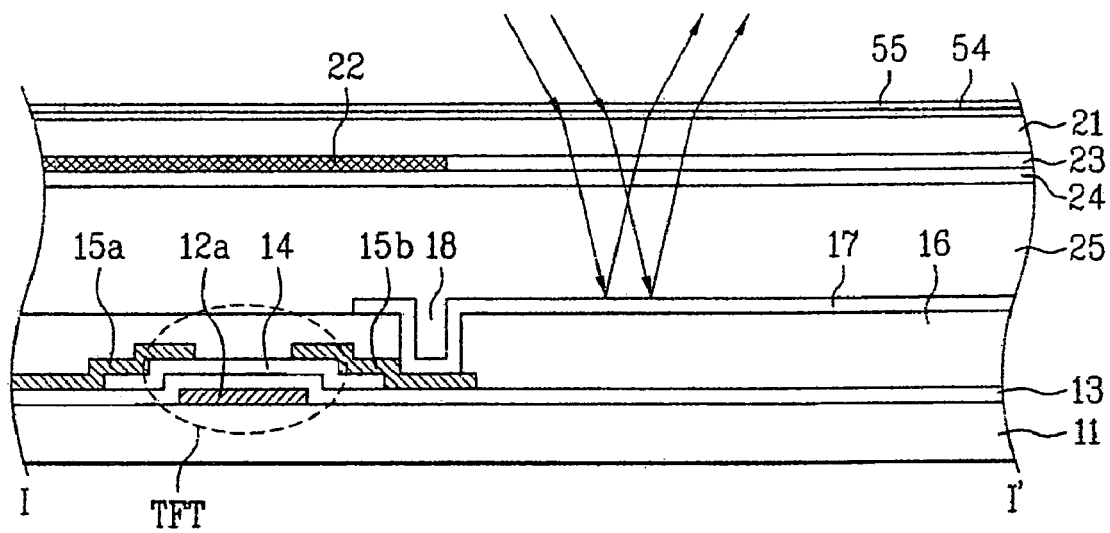
FIG. 1 is a cross-sectional diagram of a reflective type liquid crystal display device according to a related art.
Figure 2:
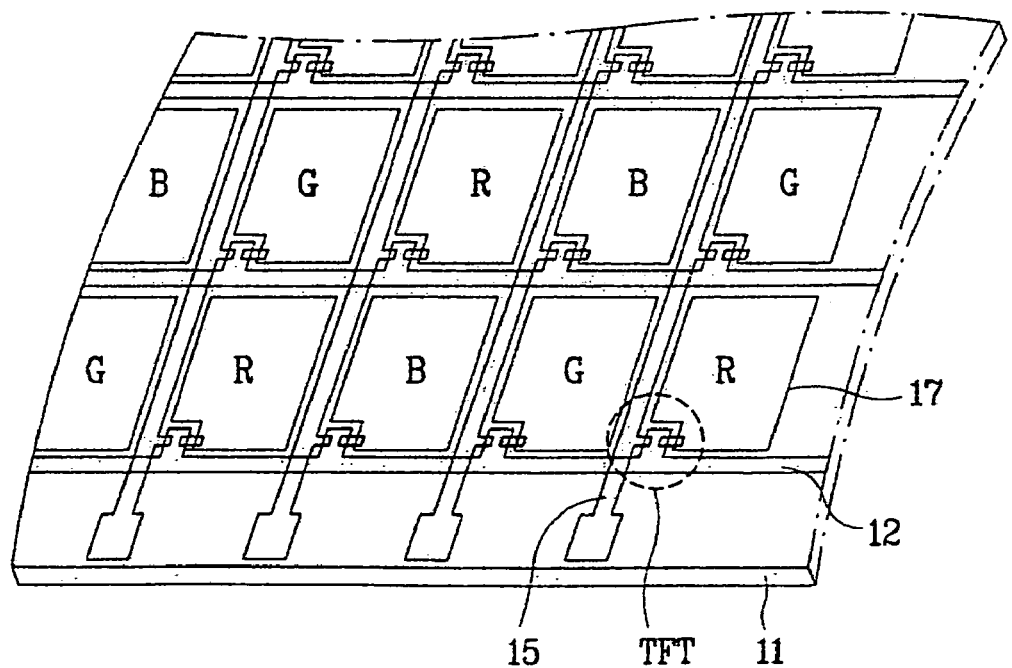
FIG. 2 is a perspective diagram of a reflective type liquid crystal display device according to a related art.
Figure 3A:
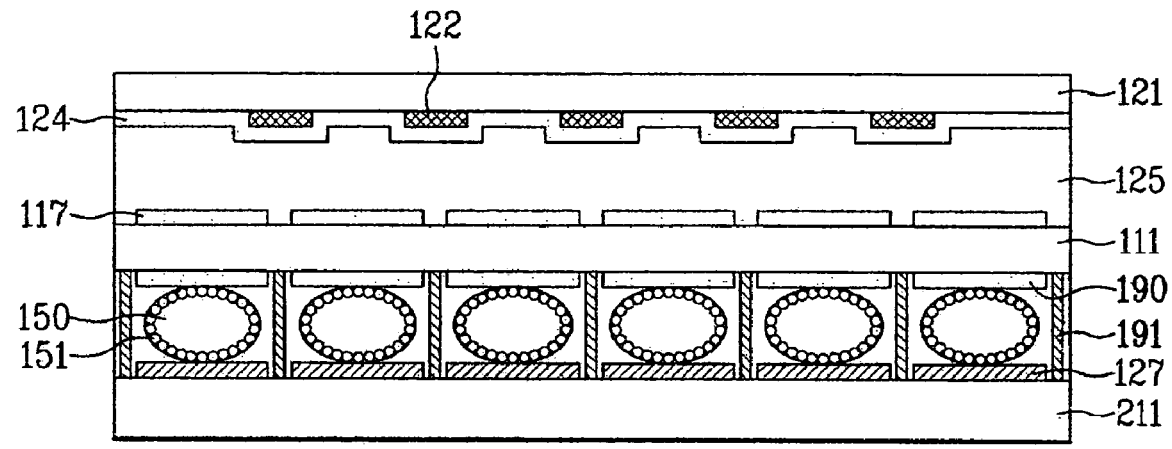
FIGS. 3A and 3B are cross-sectional diagrams of a reflective type liquid crystal display device according to the present invention.
Figure 3B:
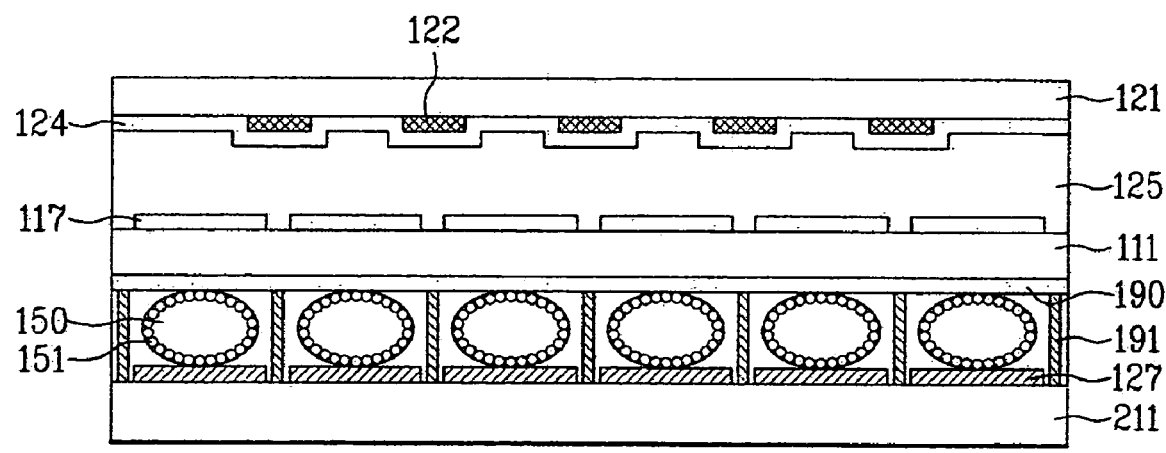
Figure 4:
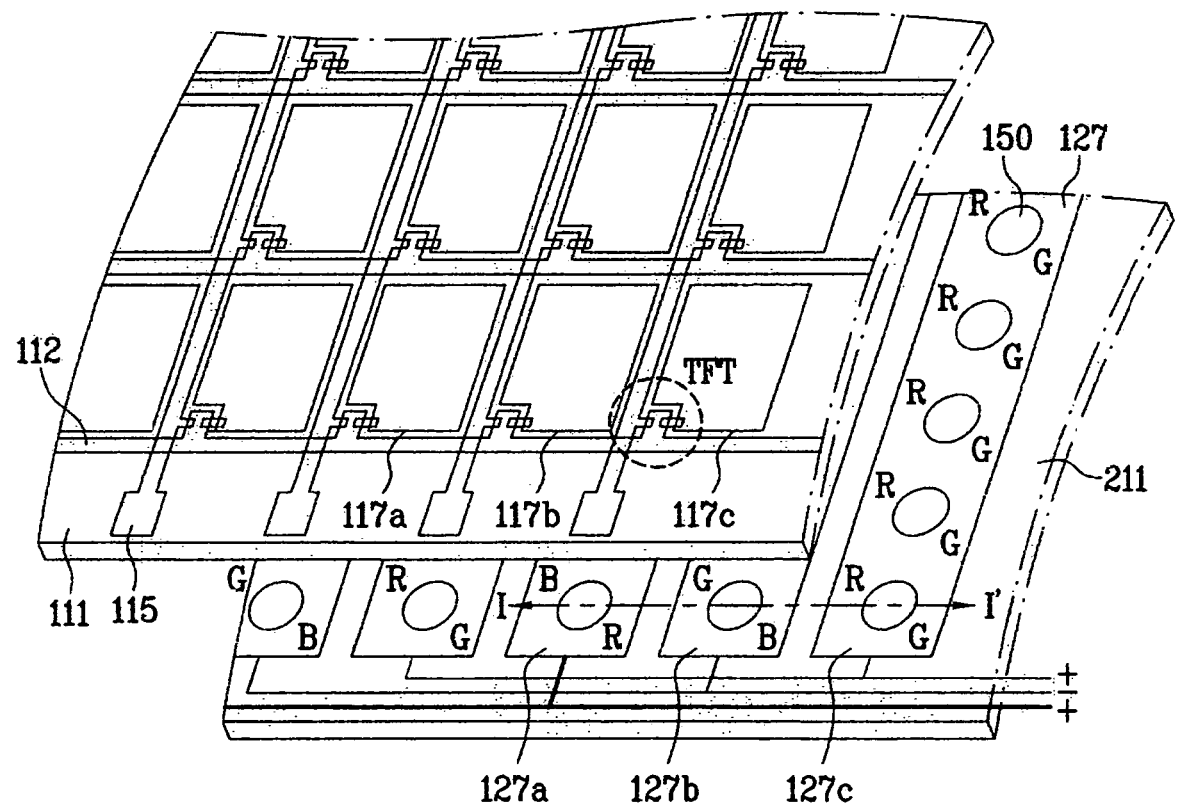
FIG. 4 is a perspective diagram of a reflective type liquid crystal display device according to a first embodiment of the present invention.
Figure 5:
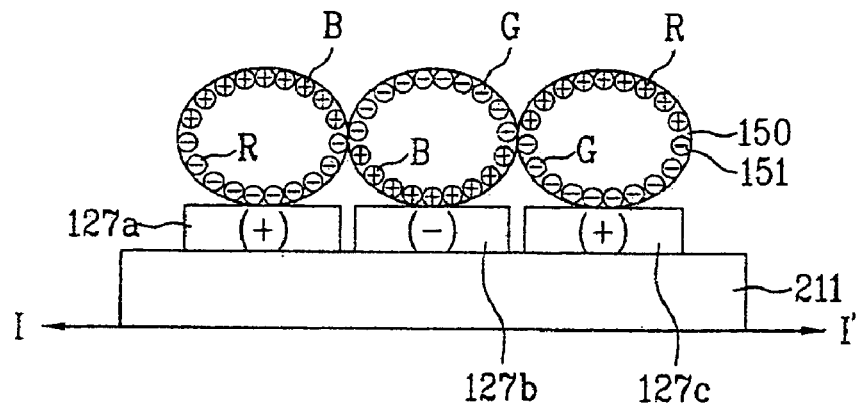
FIG. 5 is a cross-sectional diagram of a reflective type liquid crystal display device bisected along a cutting line I-I' in FIG. 4.

FIGS. 3A and 3B are cross-sectional diagrams of a reflective type liquid crystal display device according to the present invention; FIG. 4 is a perspective diagram of a reflective type liquid crystal display device according to a first embodiment of the present invention; and FIG. 5 is a cross-sectional diagram of a reflective type liquid crystal display device bisected along a cutting line I-I' in FIG. 4.

Figure 6:
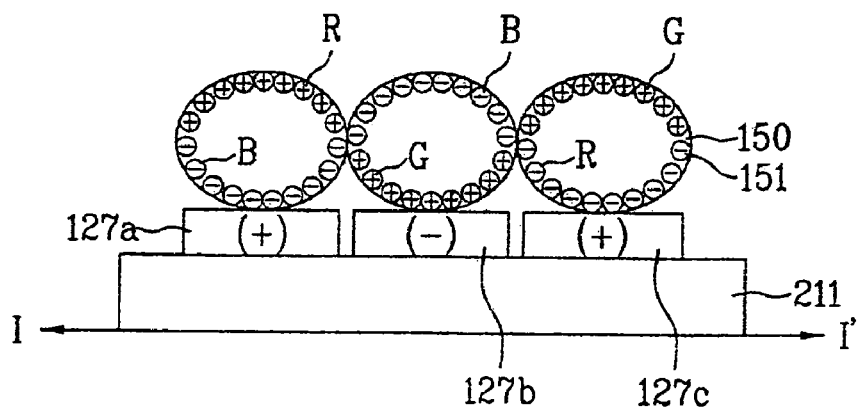
FIG. 6 is a cross-sectional diagram of a reflective type liquid crystal display device according to a second embodiment of the present invention.
Figure 7:
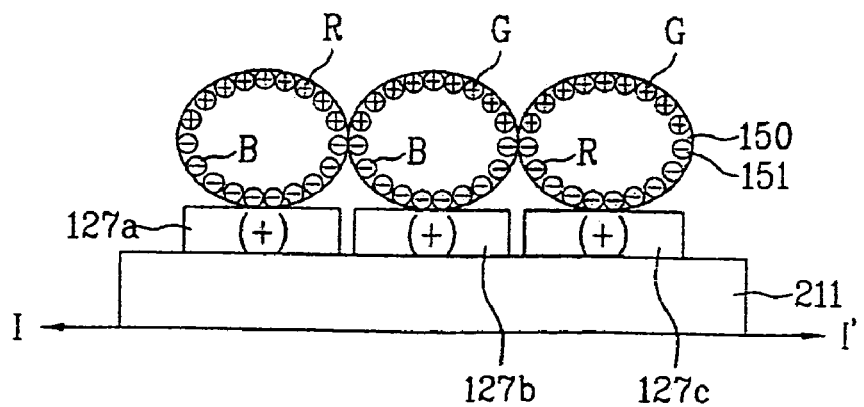
FIG. 7 is a cross-sectional diagram of a reflective type liquid crystal display device according to a third embodiment of the present invention.

FIG. 6 is a cross-sectional diagram of a reflective type liquid crystal display device according to a second embodiment of the present invention; and FIG. 7 is a cross-sectional diagram of a reflective type liquid crystal display device according to a third embodiment of the present invention.

Referring to FIGS. 3A and 3B, a reflective type liquid crystal display device according to the present invention includes a thin film array substrate 111 provided with a plurality of lines and thin film transistors, a confronting substrate 121 confronting the thin film transistor array substrate 111, a liquid crystal layer 125 injected between the thin film transistor array substrate 111 and the confronting substrate 121, a plurality of electrophoretic bodies attached to an outside of the thin film transistor array substrate 111 to implement colors by charged pigment encapsulated by microcapsules, and a color filter substrate 211 provided with a reflective electrode 127 applying an electric field to charged particles and reflecting an external natural light incident on a liquid crystal display panel.

On the thin array substrate 111, formed are gate and data lines ('112' and '115' in FIG. 4) arranged substantially perpendicular to each other to define sub-pixels, thin film transistors formed at crossings of the gate and data lines 112 and 115, respectively, and pixel electrodes 117 connected to the thin film transistors, respectively.

The thin film transistor (TFT) includes a gate electrode 112a diverging from the corresponding gate line, a gate insulating layer 113 stacked on the gate electrode 112a, an island type semiconductor layer 114 over the gate electrode 112a, and source/drain electrodes 116a/116b diverging from the corresponding data line to lie on the semiconductor layer 114.

A black matrix layer 122 as a shielding layer and a common electrode 124 producing an electric field together with the pixel electrode 117 to control alignment of liquid crystals are formed on the confronting substrate 121. The black matrix layer 122 is provided in an area where the liquid crystal molecules cannot be accurately controlled due to an unstable electric field, and more particularly, to edge areas of the sub-pixels and areas confronting the thin film transistors.

Meanwhile, the present invention is characterized in being additionally provided with the color filter substrate 211 including the electrophoretic bodies 150 and reflective electrodes 127 thereon. The electrophoretic bodies 150 act as a color filter layer, and each of the reflective electrodes 127 is operative in controlling positions of different colored pigment particles within the corresponding electrophoretic body 150.

At this point, a counter electrode 190 confronting the reflective electrode 127 may be further included on the outside of the thin film array substrate 111, so that the electrophoretic body 150 is positioned between the counter electrode 190 and the reflective electrode 127. Referring to FIG. 3A, the counter electrode 190 may be formed to have a size corresponding to that of the reflective electrode 127 and have a voltage having a polarity opposite to that of the reflective electrode 127 applied thereto. Alternatively, referring to FIG. 3B, the counter electrode 190 may be formed in a single body and have a constant voltage, which is equal to that of the ground voltage, applied thereto. Since light should be transmitted through the counter electrode 190, the counter electrode 190 is formed of a transparent conductive material.

In addition, a partition wall 191 is formed between each reflective electrode 127 for separating the electrophoretic body 150 of each unit pixel. Herein, the partition wall 191 may also simultaneously act as a spacer for maintaining a gap between the thin film array substrate 111 and the color filter substrate 211.

Specifically, the electrophoretic body 150 is a microcapsule having a diameter smaller than about 100 μm. And, a polymer material as a solvent is inserted within the electrophoretic body 150 as well as charged pigment granules. About 3~5 electrophoretic bodies 150 are provided to one sub-pixel. Yet, the number of the electrophoretic bodies 150 varies according to a sub-pixel size.

The electrophoretic body 150 is formed by encapsulating mixed pigments of ionic materials coloring R/G/B. Two of (+)charged B-pigment, (−)charged R-pigment, and (−)charged G-pigment, as illustrated in FIG. 5, are selected to be capsulated into one electrophoretic body.

For example, (+)charged blue (B) pigment particles 151 and (−)charged red (R) pigment particles 151 are mixed to be capsulated on a first reflective electrode 127a, (+)charged blue (B) pigment particles 151 and (−)charged green (G) pigment particles 151 are mixed to be capsulated on a second reflective electrode 127b, and (−)charged red (R) pigment particles 151 and (−)charged green (G) pigment particles 151 are mixed to be capsulated on a third reflective electrode 127c.

When an electric field is applied to the above-configured electrophoretic body 150, the color-different pigment particles migrate in opposite directions, respectively so that an interior of one electrophoretic body 150 is divided into two areas differing from each other in color. Namely, when a positive or negative electric field is applied to the reflective electrode 127, the pigment particles 151 of R/G/B gather on a surface of the corresponding electrophoretic body 150 to represent R/G/B colors.

Referring to FIG. 5, for example, a positive voltage may be applied to the first and third reflective electrodes 127a and 127c and a negative voltage may be applied to the second reflective electrode 127b. When a positive voltage is applied to the first reflective electrode 127a as illustrated in FIG. 5, the (−)charged red (R) pigment particles migrate downward and the (+)charged blue (B) pigment particles migrate upward.

Hence, one electrophoretic body 150 is divided into two areas to implement two colors on the first reflective electrode 127a.

Likewise, on the negative second reflective electrode 127b, the (−)charged green (G) pigment particles migrate upward and the (+)charged blue (B) pigment particles migrate downward. And, on the positive third reflective electrode 127c, the (−)charged green (G) pigment particles migrate downward and the (+)charged red (R) pigment particles migrate upward.

Consequently, B, G, and R colors are displayed on an image corresponding to the first, second, and third reflective electrodes 127a, 127b, and 127c, respectively. If opposite polarities are applied to the first to third reflective electrodes, respectively, R, B, and G colors are displayed on the corresponding image.

Meanwhile, it is also possible to encapsulate two of (−)charged B-pigment, (+)charged R-pigment, and (+)charged G-pigment into one electrophoretic body as illustrated in FIG. 6.

Namely, (−)charged blue (B) pigment particles 151 and (+)charged red (R) pigment particles 151 are mixed to be capsulated on a first reflective electrode 127a, (−)charged blue (B) pigment particles 151 and (+)charged green (G) pigment particles 151 are mixed to be capsulated on a second reflective electrode 127b, and (−)charged red (R) pigment particles 151 and (+)charged green (G) pigment particles 151 are mixed to be capsulated on a third reflective electrode 127c.

When an electric field is applied to the above-configured electrophoretic body 150, the (+)charged red (R) pigment particles migrate upward and the (−)charged blue (B) pigment particles migrate downward, on the positive first reflective electrode 127a. On the negative second reflective electrode 127b, the (−)charged blue (B) pigment particles migrate upward and the (+)charged green (G) pigment particles migrate downward. And, on the positive third reflective electrode 127c, the (+)charged green (G) pigment particles migrate upward and the (−)charged red (R) pigment particles migrate downward. Hence, the color-different pigment particles 151 migrate in directions opposite to each other, respectively so that an interior of one electrophoretic body 150 is divided into two areas differing in color from each other.

Meanwhile, a positive electric field can be collectively applied to the reflective electrodes. Namely, as illustrated in FIG. 7, (−)charged blue (B) pigment particles 151 and (+)charged red (R) pigment particles 151 are mixed to be capsulated on a first reflective electrode 127a, (−)charged blue (B) pigment particles 151 and (+)charged green (G) pigment particles 151 are mixed to be capsulated on a second reflective electrode 127b, and (−)charged red (R) pigment particles 151 and (+)charged green (G) pigment particles 151 are mixed to be capsulated on a third reflective electrode 127c.

Yet, in the embodiment, the (−)charged red pigment and (+)charged red pigment should be separately provided, whereby the corresponding process becomes complicated.

Thus, the electrophoretic body includes a first electrophoretic body consisting of R and G pigments, a second electrophoretic body consisting of R and B pigments, and a third electrophoretic body consisting of G and B pigments. The different colored pigments within the first to third electrophoretic bodies are charged by the separate electrodes, respectively.

The above-configured reflective type liquid crystal display, as illustrated in FIG. 4, enables to implement two colors in one sub-pixel, thereby providing resolution twice that of the related art sub-pixel of the same size.

Namely, three sub-pixels construct two pixels in the present invention, whereas three R/G/B sub-pixels construct one pixel in the related art. By constructing two pixels with three sub-pixels, a size of each sub-pixel can be doubled to provide the same resolution of the related art. In doing so, the increased size of the sub-pixel is accompanied with an increased opening ratio and a process error thereof can be reduced.

Meanwhile, the reflective electrode 127 can be formed to have the same size of the sub-pixel or the pixel line in FIG. 4. The reflective electrode 127 has a positive (+) or negative (-) polarity according to an external voltage applied thereto.

Besides, an external natural light is incident on the reflective type liquid crystal display device and is then reflected on the electrophoretic body 150 or the reflective electrode 127 to be externally outputted, Hence, the thin film array substrate 111 and the pixel electrode 117 should be optically transmissive.

A method of fabricating a reflective type liquid crystal display device according to the present invention is explained as follows.

FIGS. 8A to 8D are cross-sectional diagrams of a method of fabricating a reflective type liquid crystal display device according to the present invention.

Figure 8A:
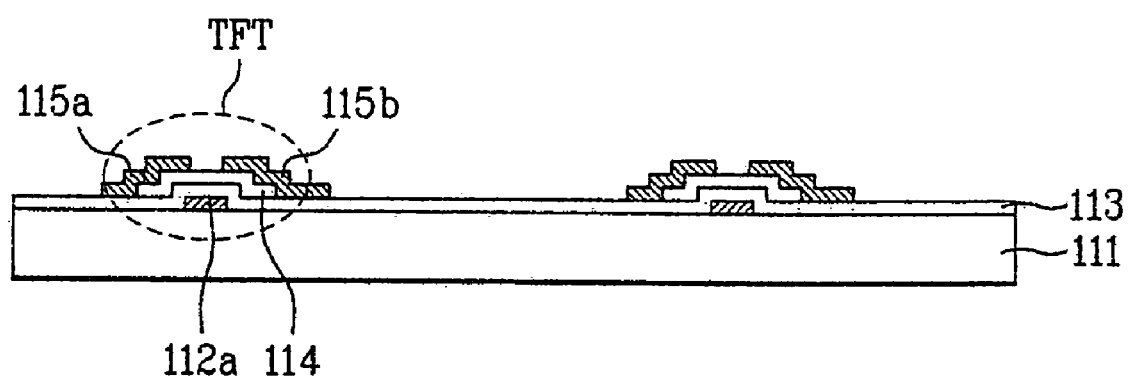
FIGS. 8A to 8D are cross-sectional diagrams of a method of fabricating a reflective type liquid crystal display device according to the present invention.

Referring to FIG. 8A, a conductive material of low resistance such as Cu, Al, Al-alloy (AlNd), Sn, Mo, Cr, Ti, Ta, Mo—W, and the like is deposited on a transparent thin film transistor array substrate 111 having an excellent insulating property by sputtering or the like. The deposited conductive material is patterned to form a plurality of gate lines ('112' in FIG. 4) and a plurality of gate electrodes 112a.

An inorganic insulating layer of a material having excellent withstanding voltage/insulation properties such as $SiN_x$, $SiO_x$, and the like is deposited on an entire surface including the gate electrodes 112a by PECVD or the like to form a gate insulating layer 113.

Amorphous silicon is deposited on the gate insulating layer 113 over the gate electrode 112a. The deposited amorphous silicon is patterned to have an island (isolated) shape to form a semiconductor layer 114. Although not shown in the drawing, impurity-implanted amorphous silicon may be deposited on the semiconductor layer to form an ohmic contact layer.

The ohmic contact layer enables ohmic contacts with source/drain electrodes that will be formed later.

Subsequently, a plurality of data lines ('115' in FIG. 4) are formed to cross with a plurality of the gate lines, thereby defining a plurality of pixel areas. Simultaneously, source and drain electrodes 115a and 115b are formed on both side ends of the semiconductor layer, respectively to complete a thin film transistor (TFT) including the gate electrode 112a, gate insulating layer 113, semiconductor layer 114, and source/drain electrodes 115a/115b.

In doing so, the data lines and source/drain electrodes are formed by depositing to pattern a conductive material of low resistance such as Cu, Al, Al-alloy (AlNd), Sn, Mo, Cr, Ti, Ta, Mo—W, and the like.

Figure 8B:
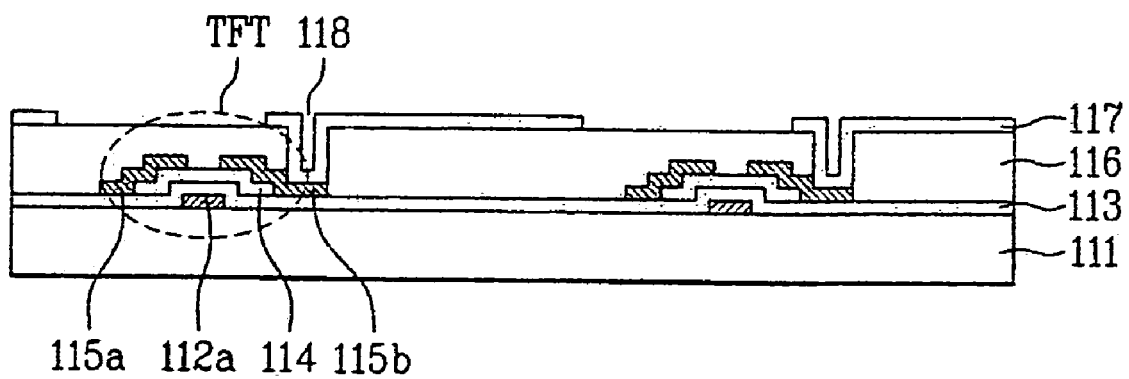

Referring to FIG. 8B, an organic insulating layer of a material such as BCB (benzocyclobutene), polyimide, acryl resin, and the like is coated on an entire surface of the substrate including the thin film transistor TFT to form a protective layer 116. A portion of the protective layer 116 is removed to form a contact hole 118 exposing the drain electrode 115b of the thin film transistor.

A pixel electrode 117 is formed on the protective layer 116 to be electrically connected to the drain electrode 115b via the contact hole 118.

The pixel electrode 117 is formed by depositing, for example, to pattern a transparent conductive material such as ITO (indium tin oxide), IZO (indium zinc oxide), and the like to be electrically connected to the drain electrode 115b via the contact hole 118.

Figure 8C:
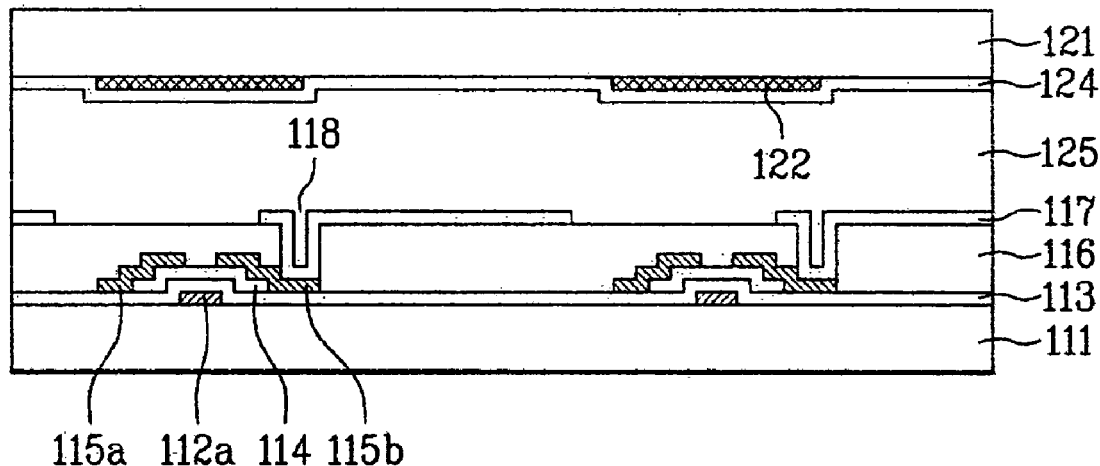

Referring to FIG. 8C, a black matrix layer 122 is formed on a confronting substrate 121 confronting the thin film transistor array substrate 111 using Cr, $CrO_x$, or the like to block light leakage from an edge of the sub-pixel and an area covering the thin film transistor. A transparent conductive material such as ITO (indium tin oxide) and IZO (indium zinc oxide) is deposited on an entire surface including the black matrix layer 122 to form a common electrode 124.

Subsequently, a seal pattern (not shown in the drawing) is formed on a periphery of a display area of the thin film transistor array substrate 111 or the confronting substrate 121. After the thin film transistor array substrate 111 and the confronting substrate 121 have been assembled to each other, liquid crystals are inserted between the assembled substrates 111 and 121 to form a liquid crystal layer 125.

Figure 8D:
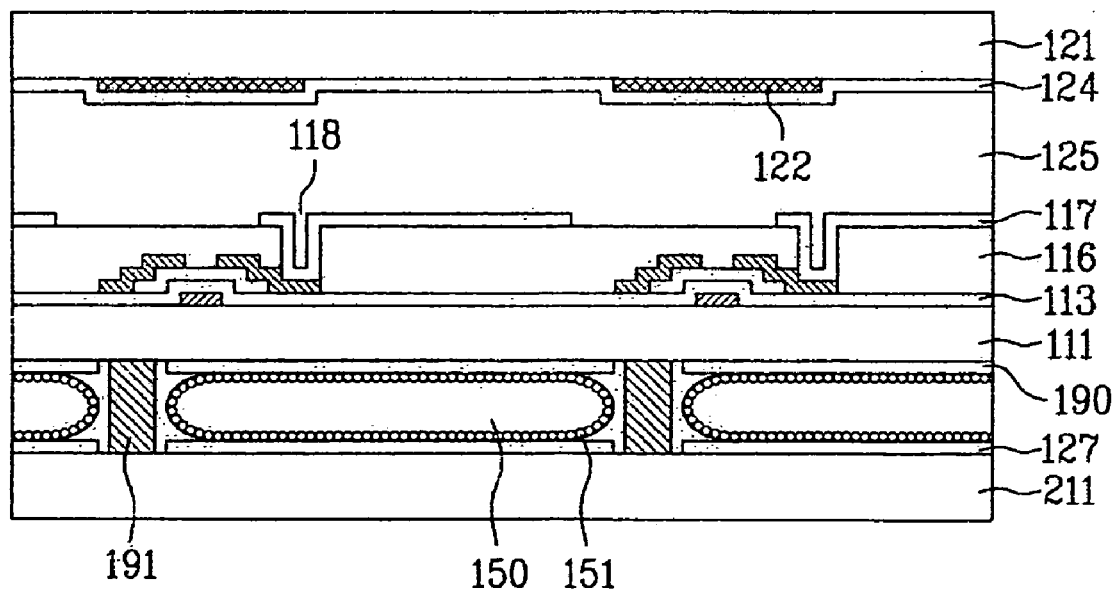

Referring to FIG. 8D, a color filter substrate 211 is separately prepared. A plurality of reflective electrodes 127 are formed on the color filter substrate 211 by depositing to pattern metal of high reflectivity enabling to reflect an external natural light thereon such as Al, Al-alloy, Ti, and the like.

The size of the reflective electrode 127 is chosen to correspond to that of the corresponding sub-pixel or the corresponding sub-pixel line each. A specific voltage is applied to the reflective electrode 127 to give a positive (+) or negative (-) polarity thereto.

After or before forming the reflective electrodes, partition walls or ribs (not shown in the drawings) may be provided between the reflective electrodes 127 to separate electrophoretic bodies differing in color from each other.

Thereafter, a plurality of electrophoretic bodies 150 are formed on a plurality of the reflective electrodes 127, respectively. In doing so, they can be formed by spin coating, dipping, dispensing, printing, ink-jet screen coating, or the like.

For instance, the electrophoretic bodied are formed by screen coating as follows.

First of all, first to third electrophoretic bodies 150 are prepared by encapsulation with a highly transmissive gel type material. After a mask pattern exposing only the first reflective electrode ('127a' in FIG. 4) has been formed, the first electrophoretic body is coated on the first reflective electrode. In the same manner, the second and third electrophoretic bodies are coated on the second and third reflective electrodes ('127b' and '127c' in FIG. 4), respectively.

In doing so, the gel type material for the encapsulation includes a fluid encapsulation material as a solvent and ionic substances colored by R/G/B pigments.

The ionic substances colored by R/G/B pigments are (+)charged blue (B) pigment particles 151, (-)charged red (R) pigment particles 151, and (-)charged green (G) pigment particles 151. Two of them are optionally selected for microencapsulation to form each of the electrophoretic bodies 150.

Specifically, the electrophoretic bodies 150, as illustrated in FIG. 5, include a first electrophoretic body consisting of (+)charged blue (B) pigment particles 151 and (-)charged red (R) pigment particles 151, a second electrophoretic body consisting of (+)charged blue (B) pigment particles 151 and (-)charged green (G) pigment particles 151, and a third electrophoretic body consisting of (+)charged red (R) pigment particles 151 and (-)charged green (G) pigment particles 151.

Alternatively, the electrophoretic bodies can be formed in a manner illustrated in FIG. 6 or FIG. 7. Yet, it is important that two-colored pigment particles should be included in one electrophoretic body and that the included two-colored pigment particles should be oppositely charged.

Thereafter, the color filter 211 including the reflective electrodes 127 and the electrophoretic bodies 150 is assembled to the thin film transistor array substrate 111 to confront each other. In doing so, the substrates are pressed to be assembled to each other to provide a less empty space between them.

Besides, on an upper surface of the confronting substrate 121, a retardation film converting an linearly polarized incident light to a circularly polarized light, and vice versa and a polarizing plate converting a natural light to a linearly polarized light by transmitting a light parallel to an optical transmission axis only can be further provided.

When an external natural light is incident on the above-configured reflective type liquid crystal display device, the external light is passed through the confronting substrate 121, liquid crystal layer 125, pixel electrode 117, and thin array substrate 111 in turn and is then reflected on the electrophoretic body 150 or reflective electrode 127 to be externally outputted. Hence, an R/G/B image can be displayed.

Thus, the above-configured reflective type liquid crystal display device implements two different colors via one sub-pixel, thereby providing an excellent quality of image.

In the above-described first, second, and third embodiments of the present invention, the electrophoretic bodies for each pixel are simultaneously operated in order to represent an image. However, the fourth embodiment of the present invention is structured to use a method for representing an image by sequentially driving the colors red (R), green (G), and blue (B) for a respective color representation within a given period of time, thereby representing the image through a mixture of colors.

The fourth embodiment of the present invention will now be described in detail with reference to FIGS. 9 to 11B.

Figure 9:
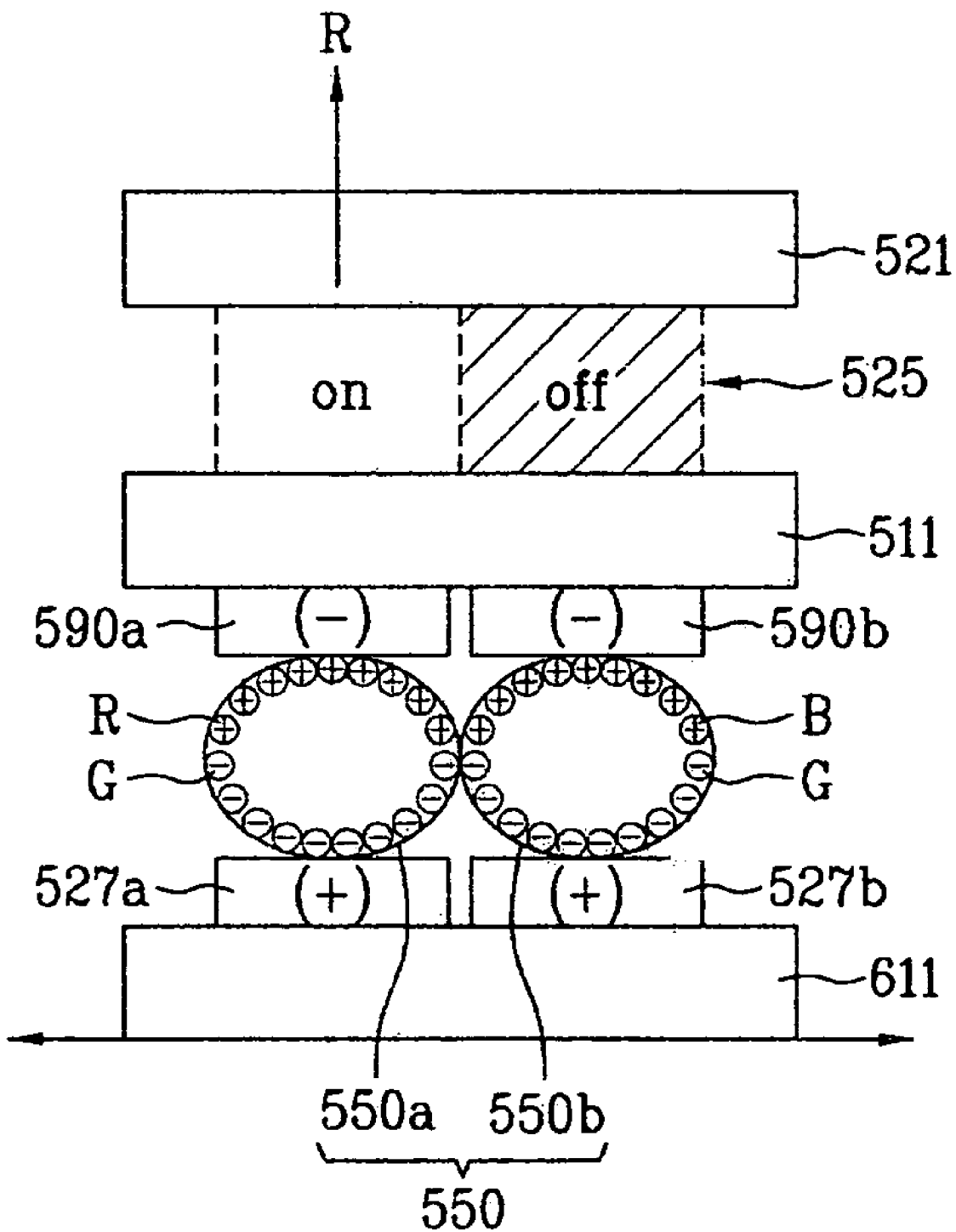
FIG. 9 is a cross-sectional diagram of a reflective type liquid crystal display device representing the color red (R) according to a fourth embodiment of the present invention.
Figure 10:
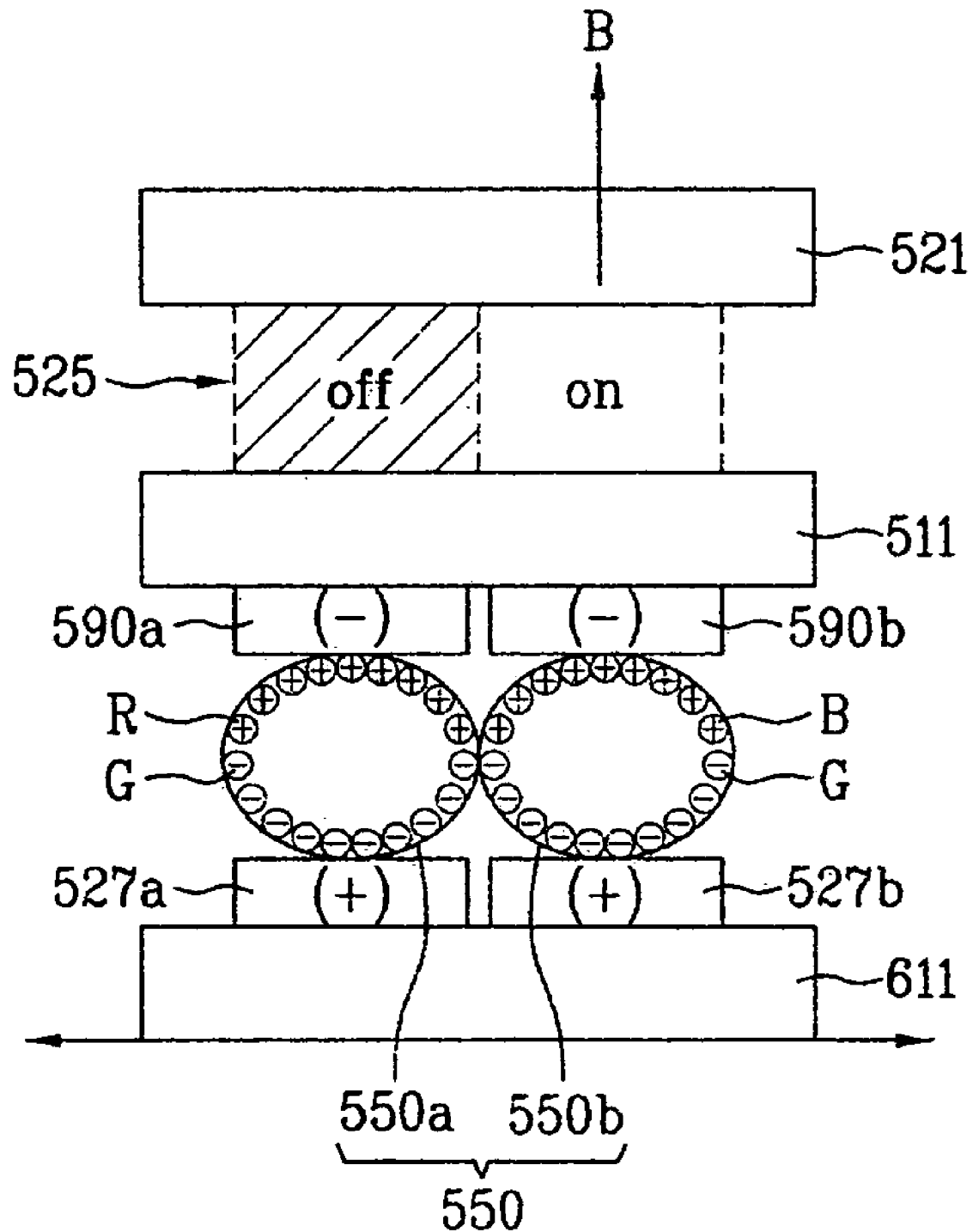
FIG. 10 is a cross-sectional diagram of a reflective type liquid crystal display device representing the color blue (B) according to a fourth embodiment of the present invention.
Figure 11A:
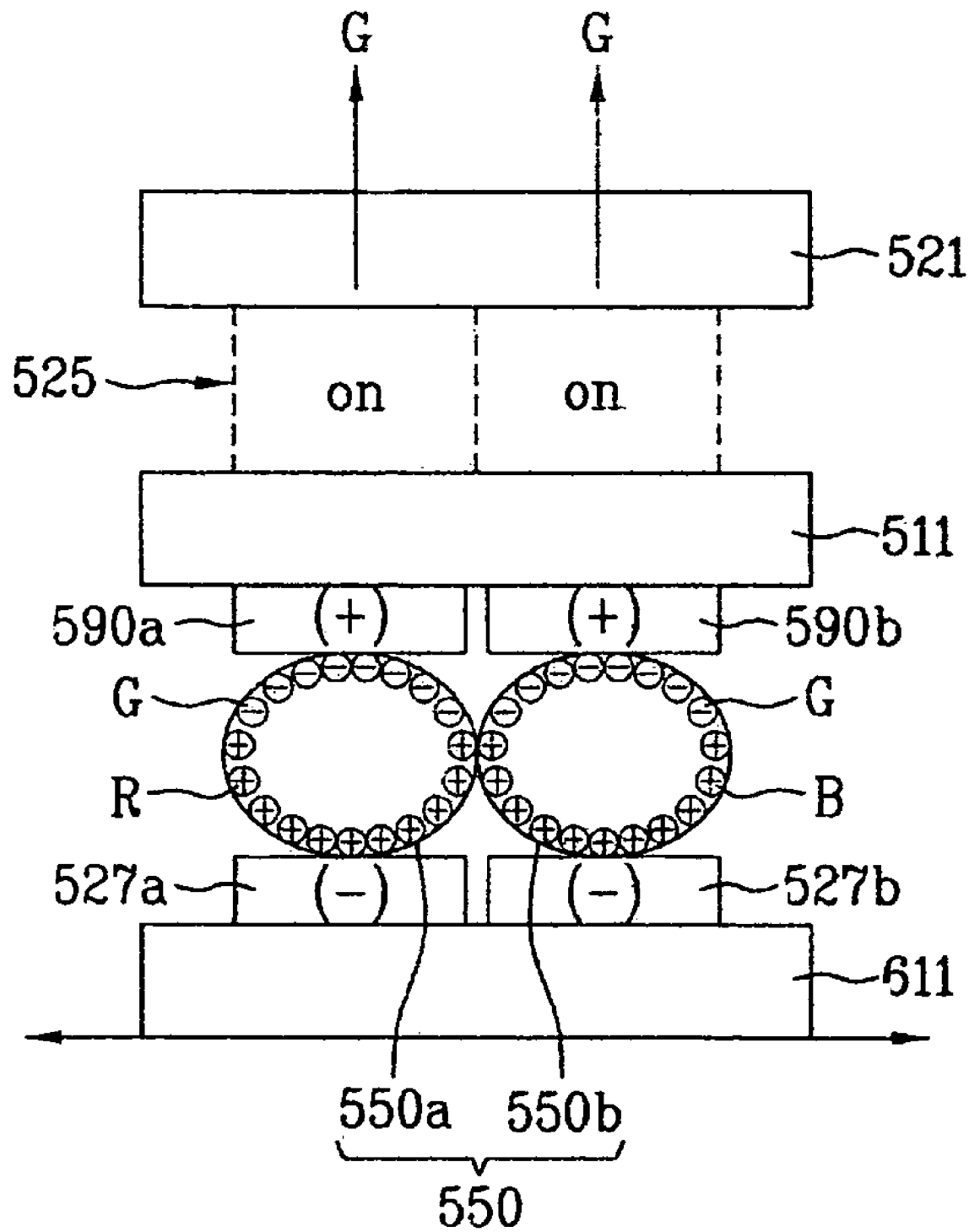
FIGS. 11A and 11B are cross-sectional diagrams of a reflective type liquid crystal display device representing the color green (G) according to a fourth embodiment of the present invention.
Figure 11B:
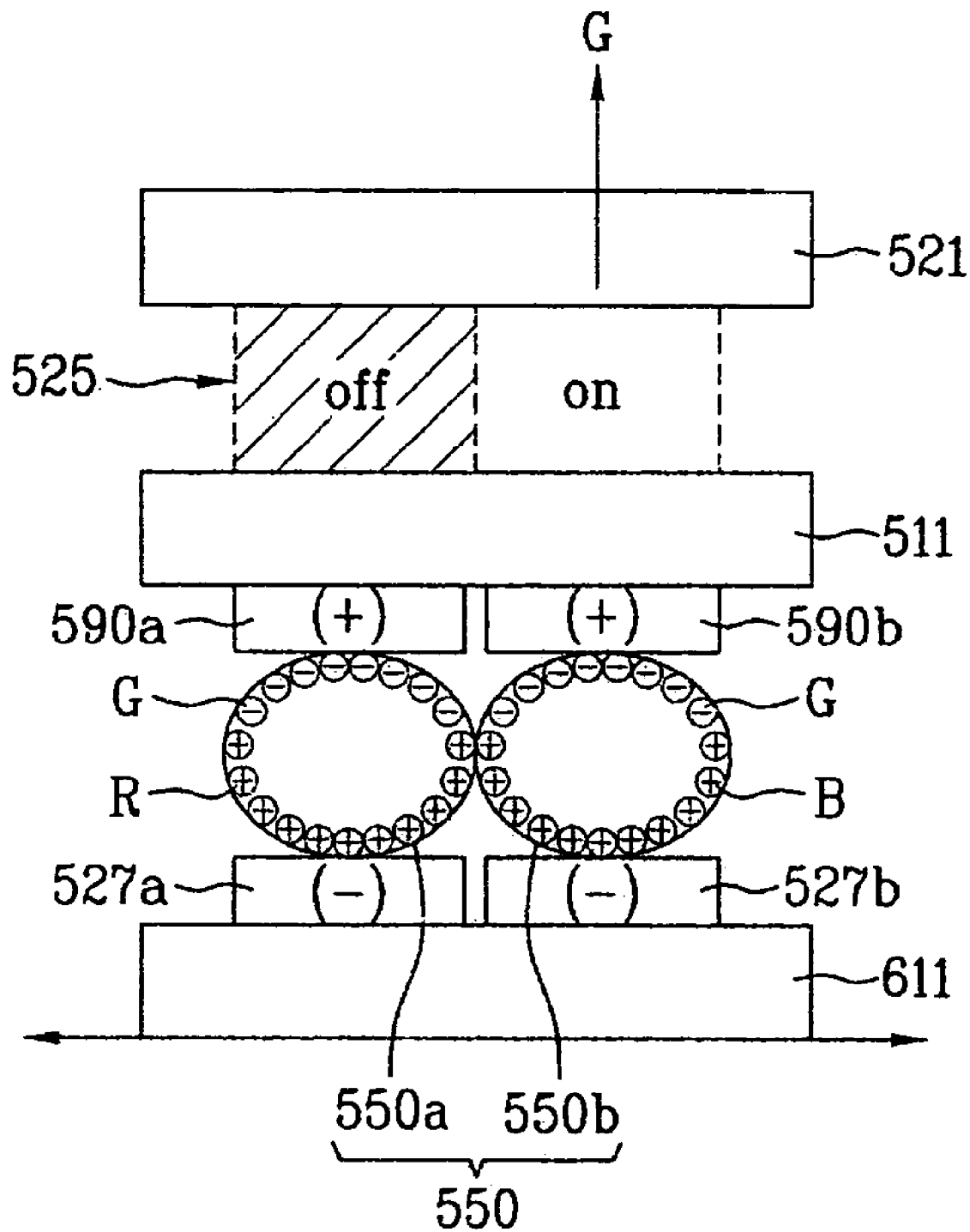

FIG. 9 is a cross-sectional diagram of a reflective type liquid crystal display device representing the color red (R) according to a fourth embodiment of the present invention; FIG. 10 is a cross-sectional diagram of a reflective type liquid crystal display device representing the color blue (B) according to a fourth embodiment of the present invention; and FIGS. 11A and 11B are cross-sectional diagrams of a reflective type liquid crystal display device representing the color green (G) according to a fourth embodiment of the present invention.

The liquid crystal display device according to the fourth embodiment of the present invention includes a thin film array substrate 511 provided with a plurality of lines and thin film transistors, a confronting substrate 521 confronting the thin film transistor array substrate 511, a liquid crystal layer 525 injected between the thin film transistor array substrate 511 and the confronting substrate 521, a plurality of electrophoretic bodies attached to an outside of the thin film transistor array substrate 511 to implement colors by charged pigment encapsulated by microcapsules, and a color filter substrate 611 provided with reflective electrodes 527a and 527b applying an electric field to pigment particles and reflecting an external natural light incident on a liquid crystal display panel.

The electrophoretic body 550 is divided into a first electrophoretic body 550a and a second electrophoretic body 550b. More specifically, (−)charged green (G) pigment particles 551 and (+)charged red (R) pigment particles 551 are mixed to be capsulated on the first electrophoretic body 550a. And, (−)charged green (G) pigment particles 551 and (+)charged blue (B) pigment particles 551 are mixed to be capsulated on the second electrophoretic body 550b. Herein, the first electrophoretic body 550a is formed on the first reflective electrode 527a, and the second electrophoretic body 550b is formed on the second reflective electrode 527b.

Meanwhile, counter electrodes 590a and 590b respectively confronting the reflective electrodes 527a and 527b may be further included on the outside of the thin film array substrate 511, so that the electrophoretic body 550 is positioned between the counter electrodes 590a and 590b and the reflective electrode 527a and 527b, respectively. Herein, each of the counter electrodes 590a and 590b may be formed to have a size corresponding to that of the respective reflective electrode 527a and 527b and have a voltage having a polarity opposite to that of the respective reflective electrode 527a and 527b applied thereto, or each of the counter electrodes 590a and 590b may be formed in a single body and have a constant voltage, which is equal to that of the ground voltage, applied thereto.

Referring to FIG. 9, in order to represent the color R of the above-described liquid crystal display device, a positive electric field may be applied to the first reflective electrode 527a and a negative electric field may be applied to the first counter electrode 590b, so that the (+)charged red (R) pigment particles in the first electrophoretic body 550a migrate upward and the (−)charged green (G) pigment particles in the first electrophoretic body 550a migrate downward. Thus, the R color can be observed from the confronting substrate 521.

At this point, the liquid crystal layer 525 on the second electrophoretic body 550b is turned off completely so that light cannot be transmitted, thereby preventing any of the G/B colors from being represented. Therefore, no voltage is applied to the second reflective electrode 527b and the second counter electrode 590b, or alternatively, as illustrated in FIG. 9, an electric field of an identical polarity may be applied to both the first reflective electrode 527a and the first counter electrode 590a for simplicity of the operation.

Also, referring to FIG. 10, in order to represent the B color, a positive electric field is applied to the second reflective electrode 527b and a negative electric field is applied to the second counter electrode 590b, so that the (+)charged blue (B) pigment particles in the second electrophoretic body 550b migrate upward and the (−)charged green (G) pigment particles in the second electrophoretic body 550b migrate downward. Thus, the B color can be observed from the confronting substrate 521. At this point, the liquid crystal layer 525 on the first electrophoretic body 550a is turned off completely so that light cannot be transmitted.

Finally, referring to FIG. 11A, in order to represent the G color, a negative electric field is applied to the first and second reflective electrodes 527a and 527b and a positive electric field is applied to the first and second counter electrodes 590a and 590b, so that the (−)charged green (G) pigment particles in the first and second electrophoretic bodies 550a and 550b migrate upward and the (+)charged red (R) pigment particles in the first and second electrophoretic bodies 550a and 550b migrate downward. Thus, the G color can be observed from the confronting substrate 521. At this point, the liquid crystal layer 525 on both the first and second electrophoretic bodies 550a and 550b is turned on so that light can be transmitted.

Meanwhile, referring to FIG. 11B, the liquid crystal layer 525 on either one of the first and second electrophoretic bodies 550a and 550b may also be turned off completely so as to prevent light from being transmitted.

However, among the R/G/B colors, the color G provides the highest luminance contribution for the display device, and so the G region is generally formed larger than the R and B regions in the reflective liquid crystal display device. Therefore, in order to increase the luminance of the display device, it is more preferable to select the structure of the former example (shown in FIG. 11A) rather than the latter example (shown in FIG. 11B).

As described above, the method for representing R/G/B colors is applied so as to represent the image data in the order of R, G, and B. At this point, when each of R/G/B is implemented within the time (e.g., 17.6 ms) corresponding to one frame, the R/G/B colors becomes mixed, thereby representing the desired image.

Similarly, R/G/B colors can be formed of two unit pixels, thereby enhancing the resolution of the image. Alternatively, when forming two unit pixels having a size corresponding to three unit pixels so as to represent an image having the same resolution, the size of the unit pixel can be increased, thereby enhancing the aperture ratio.

In order to represent the color gray in the reflective liquid crystal display device according to the present invention, a rotation angle of the liquid crystal may be used, as in the general liquid crystal display devices. However, in this case, only one of a positive electric field and a negative electric field is applied to the reflective electrode. Alternatively, an electric field having a mid-value other than the positive and negative electric fields may be applied, so as to control the dispersion of the pigment particles, thereby controlling the color representation. However, the method of applying only one of the positive and negative electric fields is more preferable.

Accordingly, a reflective type liquid crystal display device and fabricating method thereof provide the following effects or advantages.

First of all, by forming a first electrophoretic body including R and G pigment particles, a second electrophoretic body including G and B pigment particles, and a third electrophoretic body including R and B pigment particles in each unit pixel and simultaneously operating the three electrophoretic bodies, two colors can be represented in a single unit pixel, thereby providing an image resolution two times higher than the general unit pixel having the same size.

At this point, since three unit pixels construct two pixels, the same image resolution can be maintained when the size of each unit pixel is enlarged to twice its initial size. Accordingly, since the size of the unit pixel becomes twice its initial size, the aperture ratio is also enhanced, thereby reducing fabrication errors.

Secondly, when forming a first electrophretic body including R and G pigment particles and a second electrophoretic body including B and G pigment particles on each unit pixel, a liquid crystal layer on each of the first and second electrophoretic bodies is selectively turned on or off. Thus, when sequentially representing R/G/B colors, the R/G/B colors can be formed of two unit pixels, thereby enhancing the image resolution.

At this point, when forming two unit pixels having a size corresponding to three unit pixels so as to represent an image having the same resolution, the size of the unit pixel can be increased, thereby enhancing the aperture ratio.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A reflective type liquid crystal display device, comprising:
a first substrate having a plurality of thin film transistors and a plurality of pixel electrodes within a plurality of sub-pixels defined by a plurality of gate and data lines perpendicularly crossing with each other, respectively;
a second substrate assembled to oppose the first substrate;
a liquid crystal layer between the first and second substrates;
a third substrate assembled to oppose the first substrate;
a plurality of reflective electrodes on the third substrate to correspond to a plurality of the sub-pixels, respectively;
a counter electrode directly on the first substrate and facing the third substrate; and
a color filter layer having a plurality of electrophoretic bodies on a plurality of the reflective electrodes wherein each of the electrophoretic bodies is micro-encapsulated with ionic pigment particles,
wherein each electrophoretic body has two pigment particles among R, G and B pigment particles, and the color filter layer is formed between the first substrate and the third substrate.

2. The reflective type liquid crystal display device of claim 1, wherein a black matrix and a common electrode are further provided to an inside of the second substrate.

3. The reflective type liquid crystal display device of claim 1, wherein a diameter of each of the electrophoretic bodies is about 0~100 μm.

4. The reflective type liquid crystal display device of claim 1, wherein each of the electrophoretic bodies is a first electrophoretic body comprising R and G pigment particles, a second electrophoretic body comprising R and B pigment particles, or a third electrophoretic body comprising G and B pigment particles.

5. The reflective type liquid crystal display device of claim 4, wherein the R and G, R and B, or G and B pigment particles are charged with opposite polarities, respectively.

6. The reflective type liquid crystal display device of claim 1, wherein each of the electrophoretic bodies comprises a first electrophoretic body consisting of (+)charged blue (B) pigment particles and (−)charged red (R) pigment particles, a second electrophoretic body consisting of the (+)charged blue (B) pigment particles and (−)charged green (G) pigment particles, or a third electrophoretic body consisting of (+)charged red (R) pigment particles and the (−)charged green (G) pigment particles.

7. The reflective type liquid crystal display device of claim 1, wherein each of the electrophoretic bodies comprises a first electrophoretic body consisting of (+)charged red (R) pigment particles and (−)charged blue (B) pigment particles, a second electrophoretic body consisting of the (−)charged blue (B) pigment particles and (+)charged green (G) pigment particles, or a third electrophoretic body consisting of (−)charged red (R) pigment particles and the (+)charged green (G) pigment particles.

8. The reflective type liquid crystal display device of claim 1, wherein each of the electrophoretic bodies comprises a first electrophoretic body consisting of (+)charged red (R) pigment particles and (−)charged blue (B) pigment particles, a second electrophoretic body consisting of (+)charged green (G) pigment particles and the (−) charged Blue (B) pigment particles, or a third electrophoretic body consisting of the (+)charged green (G) pigment particles and the (−)charged red (R) pigment particles.

9. The reflective type liquid crystal display device of claim 1, wherein a size of each of the reflective electrodes is equal to that of each of the corresponding sub-pixels and wherein each electrophoretic body is formed on each of the reflective electrodes.

10. The reflective type liquid crystal display device of claim 1, wherein a size of each of the reflective electrodes is equal to that of each pixel line and wherein each electrophoretic body is formed on each reflective electrode line.

11. The reflective type liquid crystal display device of claim 1, wherein oppositely polarized pigment particles within each of the electrophoretic bodies migrate in opposite directions, respectively according to a voltage applied to the corresponding reflective electrode.

12. The reflective type liquid crystal display device of claim 4, wherein three of the sub-pixels construct two R/G/B pixels.

13. The reflective type liquid crystal display device of claim 1, wherein each of the pixel electrodes is a transmissive electrode.

14. The reflective type liquid crystal display device of claim 1, wherein each of the first substrate and the second substrate is a transparent substrate.

15. The reflective type liquid crystal display device of claim 1, further comprising a partition wall between the reflective electrodes.

16. The reflective type liquid crystal display device of claim 1, wherein the partition wall also acts as a spacer.

17. The reflective type liquid crystal display device of claim 1, wherein the electrophoretic body comprises a first electrophoretic body consisting of R and G pigment particles, and a second electrophoretic body consisting of B and G pigment particles.

18. The reflective type liquid crystal display device of claim 17, wherein the liquid crystal layer on the first electrophoretic body is turned off completely so as to represent one of B color and G color, and wherein the liquid crystal layer on the second electrophoretic body is turned off completely so as to represent one of R color and G color.

19. The reflective type liquid crystal display device of claim 18, wherein the R, G, and B colors are sequentially represented within one frame period.

20. The reflective type liquid crystal display device of claim 17, wherein each of the pigment particles being different from one another within the first and second electrophoretic bodies is charged with a different electrode.

21. The reflective type liquid crystal display device of claim 17, wherein one R/G/B pixel is formed of two unit pixels.

22. The reflective type liquid crystal display device of claim 1, wherein the electrophoretic body comprises:
a first electrophoretic body consisting of (+)charged red (R) pigment particles and (−)charged green (G) pigment particles; and
a second electrophoretic body consisting of (+)charged blue (B) pigment particles and (+)charged green (G) pigment particles.

23. The reflective type liquid crystal display device of claim 1, wherein the electrophoretic body comprises:
a first electrophoretic body consisting of (+)charged green (G) pigment particles and (−) charged red (R) pigment particles; and
a second electrophoretic body consisting of (+)charged green (G) pigment particles and (−)charged blue (B) pigment particles.

* * * * *